Y. ROLLAND.
APPARATUS FOR AERIAL NAVIGATION.
APPLICATION FILED APR. 1, 1911.

1,001,309.

Patented Aug. 22, 1911.

Witnesses:

Inventor.
Yves Rolland
by Poole & Brown Attys

Y. ROLLAND.
APPARATUS FOR AERIAL NAVIGATION.
APPLICATION FILED APR. 1, 1911.

1,001,309.

Patented Aug. 22, 1911.
6 SHEETS—SHEET 5.

Witnesses:
Inventor:
Yves Rolland
by Poole & Brown Attys

Y. ROLLAND.
APPARATUS FOR AERIAL NAVIGATION.
APPLICATION FILED APR. 1, 1911.

1,001,309.

Patented Aug. 22, 1911.
6 SHEETS—SHEET 6.

1,001,309. APPARATUS FOR AERIAL NAVIGATION. YVES ROLLAND, Chicago, Ill., assignor to Lewis C. Doggett, Chicago, Ill. Filed Apr. 1, 1911. Serial No. 618,351.

*To all whom it may concern:*

Be it known that I, YVES ROLLAND, a citizen of the United States, and a resident of Chicago, in the county of Cook and State of Illinois, have invented certain new and useful Improvements in Apparatus for Aerial Navigation; and I do hereby declare that the following is a full, clear, and exact description thereof, reference being had to the accompanying drawings, and to the letters of reference marked thereon, which form a part of this specification.

This invention relates to an improvement in apparatus and means for aerial navigation, and more especially to means for automatically balancing the apparatus or for counteracting the effect of air currents that may tend to tip or tilt the apparatus either laterally or endwise.

The invention consists in the matters hereinafter described and pointed out in the appended claims.

In the accompanying drawings illustrating my invention.

As shown in said drawings, 5 indicates the main frame or body of the apparatus, which, as shown, has the form of a horizontally arranged, tubular shell or casing, circular in cross-section and tapered toward its ends, and 6 and 7 indicate forward and rear tapered or conical extensions of said main frame or body, which are made of lighter material than said main frame or body. As illustrated, said main frame or body consists of an exterior covering of sheet metal applied or attached to interior, annular stiffening ribs or rings 8, 8, 8. The said forward and rear extensions 6 and 7 will preferably consist each of longitudinal frame members 9, 9 provided with a covering 10 of canvas or other flexible material.

12, 12 indicate main, lateral, supporting planes or wing members, which are attached to and extend outwardly from the opposite sides of the frame or body 5. As illustrated, (Figs. 7, 8 and 9) each of said wings consists of longitudinal frame members 13, 13, which are joined with each other by transverse frame members 14, 14, and a covering 15, of cloth or other suitable light and thin material which is stretched between and secured to the said frame members. The frames of the wing members are rigidly attached to the sides of the main frame 5, preferably at a considerable distance above the level of the center of said body. Said wing members are connected with the body 5 by means of tie-rods or wires 16, 16, 16, which are attached to the sides of the body 5, near the bottom part of the same and extend outwardly and upwardly to the said wing members, to which the said rods or wires are attached at or near the outer ends of the wing members, and at points intermediate the ends of the latter. The wing members are further stiffened and held in place by means of tension rods or wires 17, 17, 17 connected at their inner ends with a post or standard 17ª, which rises from the top of the body 5, and extending therefrom to the wings, being attached to the marginal frame members at the outer ends of the wing members and at intermediate points along their side margins.

At the forward end of the apparatus is a horizontally arranged rudder 18 (Figs. 13 and 14,) adapted to be swung or turned on a transverse, horizontal axis, and which is under the control of the operator for the purpose of changing the course of the apparatus upwardly or downwardly, or to effect rising and falling movement of the same. At the rear end of the apparatus is arranged a horizontal plane or tail member, indicated as a whole by 19, having the usual functions of such a tail member, in tending to maintain the longitudinal equilibrium of the apparatus when in flight. At the rear end of said tail member 19 is mounted a vertical or steering rudder 20, by which the course of the apparatus is controlled.

The horizontal rudder 18 (Figs. 1, 13 and 14,) is constructed and connected with the main frame of the apparatus as follows: Attached to and extending forwardly from the forward extension 6 of the body are two horizontal, rigid frame members 21, 21, which form forward extensions of two of the longitudinal frame members, 9, 9, and converge toward each other at their forward ends and are connected with each other, at a short distance rearwardly from their forward ends by a transverse frame member 22. Said forward ends of the frame members 21, 21, are provided with sockets or bearings 23, 23, in which is mounted a transverse, horizontal pivot rod 24. Said horizontal rudder, which as a whole is indicated by 18, consists of a forward rectangular portion 25 which is located forward of the pivot rod 24, and two laterally arranged parts or wings 26, 26, located at the rear of the pivot rod 24 and outside of the forward end of the body extension 6. The parts 25, 26, 26 of said horizontal rudder may be made in a suitable way, but, as shown, said parts consist of a main transverse frame member 27 with which the pivot rod 24 is directly engaged, two longitudinal frame members 28, 28 extending forward from said frame member 27, and two frame bars 29, 29 extending around the margins of the rearwardly extending parts or wings; a covering of cloth or other flexible material being applied to said frame members 27, 28, 29, in the usual manner. Attached to the main transverse frame member 27 is a rigid arm or standard 30 which rises from said frame member, to the upper end of which is pivoted an endwise movable operating rod 31 through the means of which the horizontal rudder, as a whole, is swung or turned on its horizontal transverse axis. To suitably stiffen the frame of said horizontal rudder, tie-rods or wires 32, 32, 32 are extended from the upper end of the standard 30 outwardly and downwardly to the exterior corners of the frames of the members 25 and 26, 26. A rigid arm or standard 33 extends downwardly from the transverse frame member 27, and tie rods or wires 34 extend from the lower end of the same to the outer corners of the frame, as clearly seen in Fig. 13.

Figure 15:
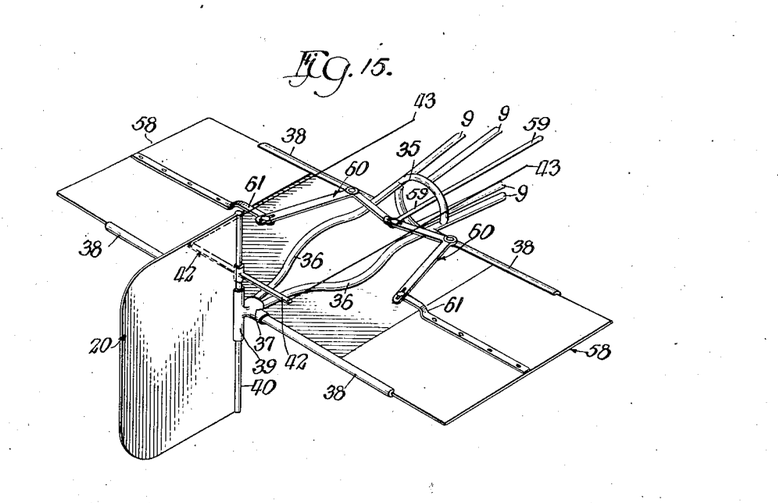
Fig. 15 is a perspective view of the tail member of the apparatus, together with the vertically arranged steering member or rudder.

In the case of the rear horizontal plane or tail member 19, the same is supported by means of two longitudinal frame bars 36, 36 (Fig. 15) arranged in the same horizontal plane and which are connected with each other by a ring 35, to which is attached the rear ends of the longitudinal frame bars 9, 9. Said frame-bars 36, 36 are joined at their rear ends to a frame casting 37. Transversely arranged, horizontal frame arms 38, 38 extend outwardly from the frame bars 36, 36 and flexible material is secured to and stretched between said frame bars 38, 38 so as to form two planes that together form the said tail member. The frame casting 37 is provided with an upright bearing sleeve 39 in which is mounted an upright shaft 40, carrying the vertical or steering rudder 20. Said shaft 40 is provided with lateral arms 42, to the outer ends of which are connected operating rods or wires 43, through which the rudder is swung or moved by the operator.

Figures 1, 11, 12, 13:
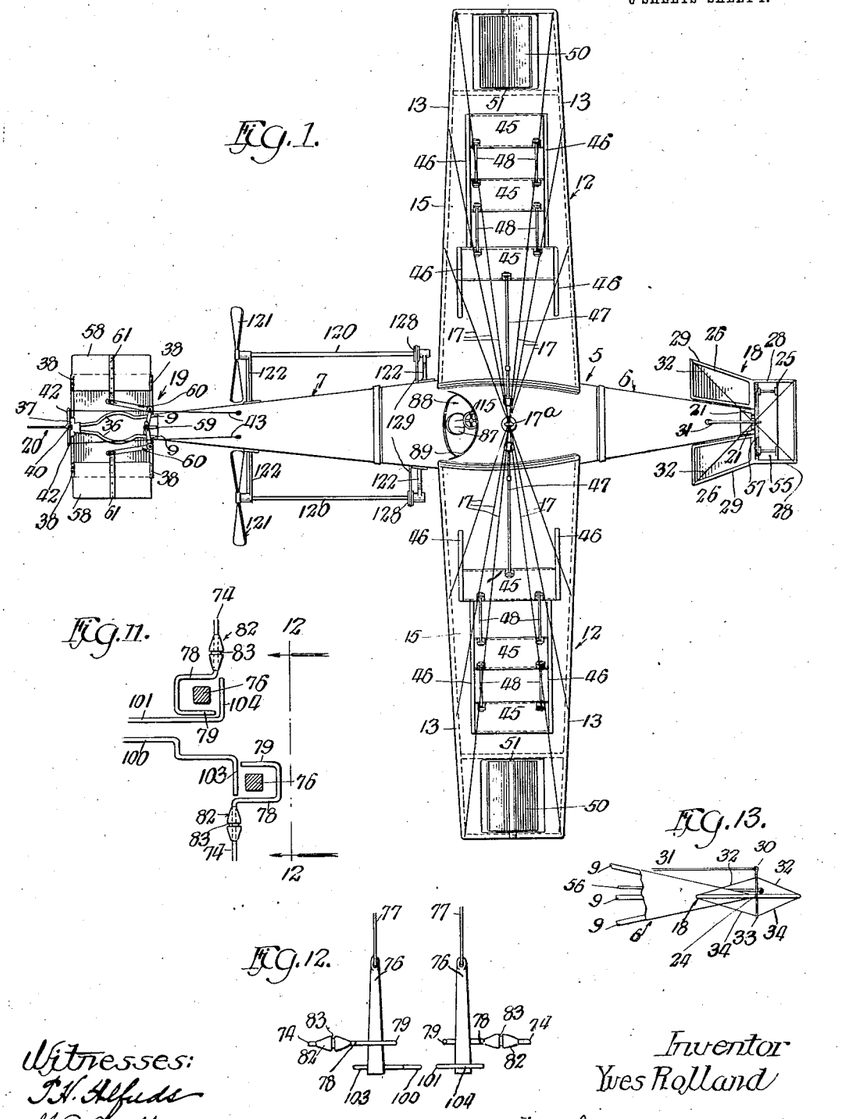
Figure 1 is a plan view of a flying machine or apparatus embodying my invention.
Fig. 11 is a detail plan section, taken horizontally through the controlling weights of the apparatus, and showing in plan view the parts directly operated by said weights.
Fig. 12 is a sectional view, taken upon line 12—12 of Fig. 11, illustrating in side elevation the parts shown in said Fig. 11.
Fig. 13 is a view in side elevation of the forward end of the apparatus and the horizontal rudder.
Figures 7, 8, 9, 10:
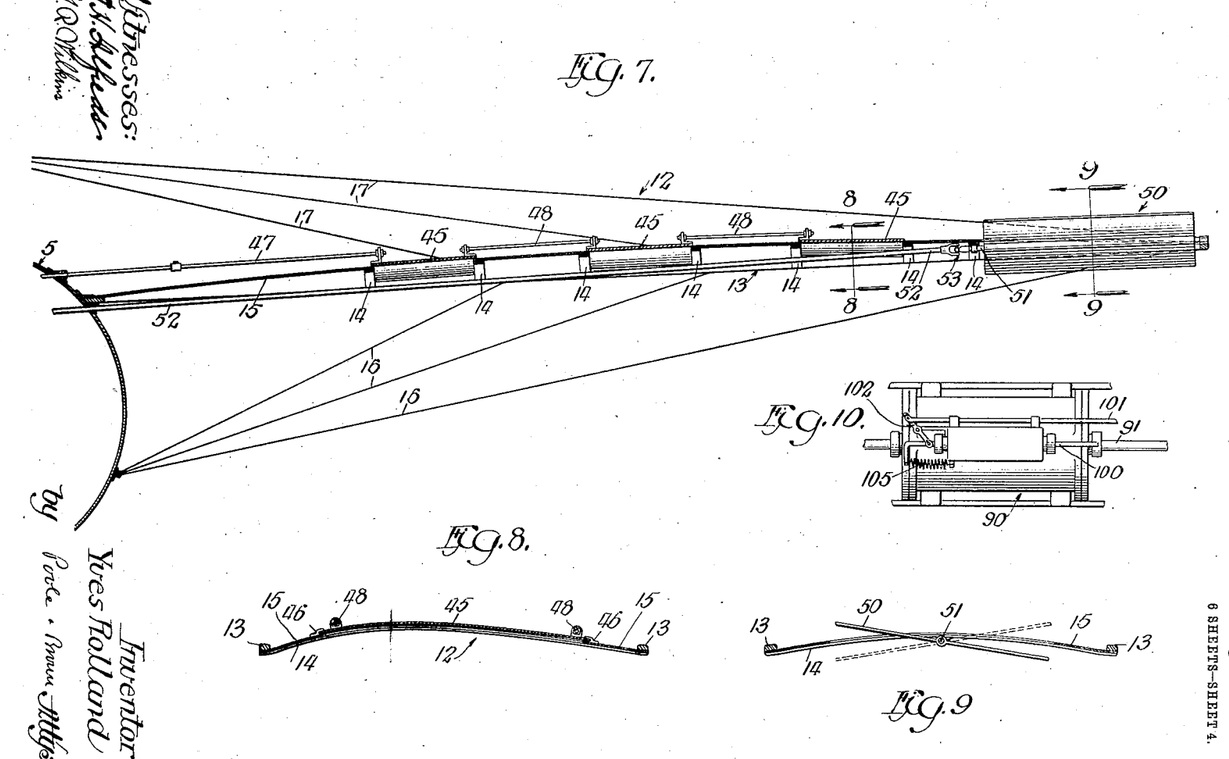
Fig. 7 is a view in longitudinal, vertical section of one of the lateral supporting planes or wings of the apparatus.
Fig. 8 is a cross-section, taken upon line 8—8 of Fig. 7.
Fig. 9 is a cross-section, taken upon line 9—9 of Fig. 7.
Fig. 10 is a detail plan view of the motor cylinder which operates the movable section of the horizontal rudder and tail member.

Now referring more specifically to the features of construction in the lateral supporting planes or wings, which form part of the means for maintaining the lateral balance of the machine, a construction is provided as follows: Each of the wing members 12, 12 is provided (Figs. 1 and 7,) with a plurality of openings which, as shown in the drawings, are three in number, are of rectangular form and have their greater dimensions extending transversely of the wing member. In connection with these openings are employed sliding gates or shutters 45, 45, 45 arranged to be moved in the direction of the plane of the wing member, so as to completely cover or close the openings referred to, or to open or uncover the same to a desired extent. The general purpose of these sliding shutters is to permit the effective supporting area of either one of the wing members to be decreased, in case of upwardly moving air currents acting on such wing member in a manner to tip or tilt laterally the entire apparatus. In other words, in case an air current acts upwardly on one of the wing members, or downwardly on the other wing member, thereby throwing the apparatus into an inclined position, air will pass through the openings formed by the movement of the shutters of that one of the wing members which is elevated or thrown upwardly, with the effect of lessening the upward pressure on the same, allowing it to descend and the apparatus to resume its horizontal position. As illustrated, the several shutters 45, 45, 45 are formed of thin rigid material and are arranged to slide at their side margins in grooved guide strips 46, 46 secured to the transverse frame members 14, 14 of the wing-frames. Attached to the innermost shutter 45 is an operating rod 47, through which all of the shutters on each wing are operated and which extends into the body 5, wherein devices for operating the shutters are located. The several shutters are connected with each other by means of rods 48, 48 (Figs. 1 and 7).

At the outer ends of the wing members are arranged rotative controlling planes 50, 50 arranged to turn on horizontal axes extending longitudinally of the wing members or transversely to the central longitudinal line of the machine. Said planes 50 are shown as mounted in openings formed in the outer end portions of the wing members, and are attached to supporting shafts 51, 51 mounted in suitable bearings in the transverse members of the wing frames. For operating said controlling planes rock-shafts 52 extend from the interior of the body 5, beneath the wing members, to the inner ends of the shafts 51 with which they are connected by means of universal joints 53. Said controlling planes 50, 50 are turned or moved by the operator for the purpose of counteracting any tendency of the apparatus to get out of balance by the rising or falling of the outer ends of the wing members in the advance movement of the apparatus; said planes 50 in this respect performing the same function performed by like pivoted controlling planes heretofore used in apparatus of this kind.

With respect to the horizontal rudder 18 and the tail member 19, devices are provided for increasing and decreasing the areas of the same, so that the area of the rudder 18 will be decreased when that of the tail member is increased and vice versa, as needed, to prevent the rear end of the apparatus from rising above or falling below the normal position with respect to the line of flight; this action being automatic and independent of the tipping or tilting of the apparatus effected for the purpose of producing rising and falling movement thereof by the shifting of the said horizontal steering rudder 18.

The expansible and contractible rudder and tail member described operate as does a weather-vane, to maintain the longitudinal axis of the machine in the direction of the line of flight, the parts being so made that the area of the tail member is increased whenever said tail member rises above or descends below its normal position, by the tipping or tilting of the apparatus in a transverse axis, so that the air pressure, in the rapid forward movement of the apparatus, will act with increased effect on the under side of the tail member, if depressed, or on its upper side, if elevated, in a manner to swing the apparatus back to a position with its longitudinal axis in the direction of the line of flight; the area of the horizontal rudder being decreased when that of the tail member is increased, to aid in producing this result. From the above it will be understood that the general purpose of this feature of construction is to give a preponderance of action in the tail member, in case of an abnormal tipping of the apparatus longitudinally, such as may be produced by irregular air currents acting momentarily in a downward or upward direction on the horizontal rudder or tail member, so that the air through which the apparatus is passing will act on the tail member to swing the apparatus back to its normal position relatively to the line of flight, in the same manner that the action of the wind on a weather-vane holds the latter pointed in the direction from which the wind is coming.

Figure 14:
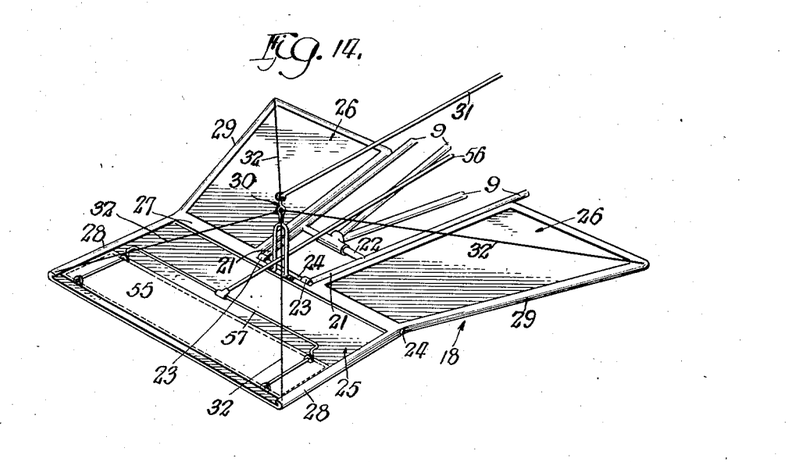
Fig. 14 is a perspective view of the forward end of the apparatus and the horizontal rudder there located.

Referring now to the construction illustrated in the details by which this result is accomplished: In the case of the forward plane, as shown in Fig. 14, the forward section 25 thereof is provided with a transversely extending opening, located near its forward edge. A horizontal, sliding shutter 55, consisting of fabric applied to a rectangular frame, is arranged to cover and close said opening or to be shifted so as to partially or fully open the same. As illustrated, the shutter 55 slides at its ends in guide grooves formed in the lateral frame members 28, 28, and a longitudinally extending operating rod 56 is connected with said shutter for the purpose of giving backward and forward movement to the same. Said operating rod 56 is shown as being attached at its forward end to a transversely extending rod 57, the end portions of which are bent at right angles and extend forwardly, parallel with the side margins of the shutter, and are attached to the front and rear members of the rectangular frame of said shutter.

In the case of the tail member 19, the lateral parts of the same are provided with horizontally and laterally sliding members 58, 58, which are adapted to be extended to a greater or less distance beyond the exterior side margins of said parts, so as to increase or decrease the effective area of the tail member as a whole. As shown, the sliding members 58, 58 are of rectangular form and are engaged at the front and rear margins thereof with guide grooves found in the transverse frame members 38, 38. To give movement to said members 58, 58, inwardly and outwardly, as described, I have shown in the drawings a construction in which an endwise movable operating rod 59 is pivotally connected at its rear end with the transverse arms of two bell-crank levers 60, 60, which bell-crank levers are pivoted on the frame members 38, 38 and have their longitudinal arms connected with the inner ends of two rigid arms 61, 61 attached to and extending inwardly from the sliding members 58, 58.

The operating rods 56 and 59 for the movable sections of the horizontal rudder and tail member, are connected, inside of the body 5, with operating means by which the rods are simultaneously so moved that the area of the rudder will be decreased when that of the tail member is increased, and such operating means is controlled automatically by the tipping or tilting of the apparatus, as will be hereinafter described.

Now referring to the means illustrated for giving movement to the sliding gates or shutters 45, 45, 45 on the lateral wing members 12, it may first be stated that devices are provided for operating the shutters on each wing that are separate from and operate independently of like devices for operating the shutters of the other wing, and these shutter operating devices embrace in each instance a motor operated by suitable power, such as compressed air, together with means for controlling the operation of said motor, embracing a movably supported or shifting weight, such as a pendulum, which is mounted on the frame of the machine in such manner that its position on the frame will be shifted laterally in case of the tipping of the machine from its normal or horizontal position.

Figure 4:
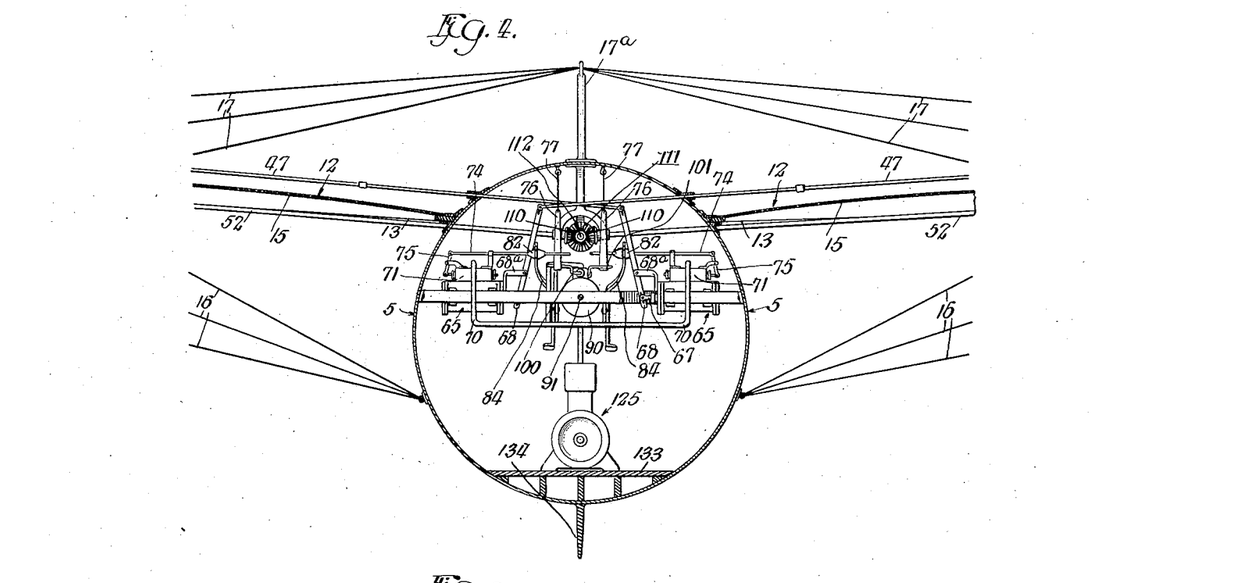
Fig. 4 is a transverse section, taken upon line 4—4 of Fig. 2.
Figure 5:
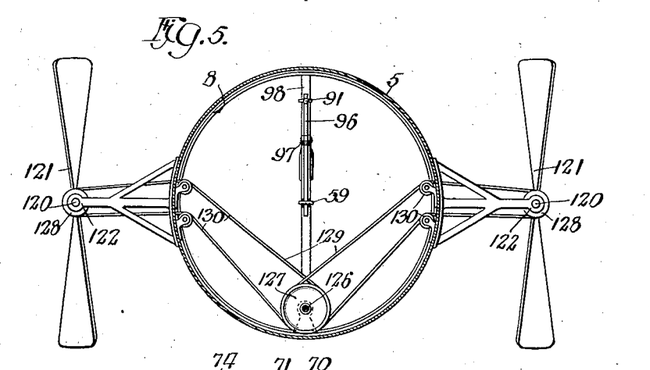
Fig. 5 is a transverse section, taken upon line 5—5 of Fig. 3.
Figure 6:
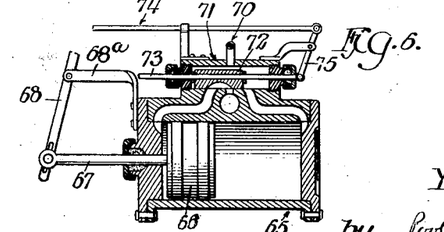
Fig. 6 is an enlarged detailed section of one of the motor cylinders, for operating the shutters of the lateral wing members, shown in Figs. 2, 3 and 4.

Now referring in detail to the construction illustrated, Figs. 2, 3, 4, 6, 11 and 12 in such devices for actuating the gates or shutters, and describing the devices used in connection with one of the wing members only, (it being understood that these devices are substantially alike or are duplicated for the two wing members,) 65 indicates a horizontal, transversely arranged power cylinder mounted on the machine frame inside of the body 5. Said cylinder contains a piston 66, with which is connected a piston rod 67 passing through one end or head of the cylinder. Said piston rod is connected at its outer end with a vertically arranged rocking lever 68, pivoted between its ends to a suitable supporting arm 68ª and connected at its upper end with the inner end of one of the operating rods 47 which, as before stated, extends from the interior of the hollow body of the apparatus outwardly to, and is connected with, the shutters 45, 45, 45. As shown in Fig. 4, the piston rod of the cylinder 65 at the right hand side of the machine is connected with the operating rod 47 belonging to the wing member at the opposite or left hand side of the apparatus. Compressed air is supplied to the cylinder 65 from a storage tank 69 through a supply pipe 70. Said cylinder 65 is provided with a valve chest 71, with which the supply pipe 70 communicates, and which contains a sliding valve 72. Said sliding valve is substantially like an ordinary D-valve, and operates in connection with suitable admission and exhaust ports in the cylinder, arranged in the usual manner. The valve 72 is attached to an endwise sliding valve rod 73 which is connected with and is operated by a horizontal, transversely arranged rod 74, arranged to slide endwise in suitable guides on the frame of the apparatus in the construction illustrated (as shown more plainly in Fig. 6). The valve 72 is connected by a rocking lever 75 with the outer end of the said rod 74. Said rod 74 is adapted to be acted upon and moved endwise by a shifting weight 76, shown in the drawings as having the form of a pendulum, the same being supported by a suspension member 77 from the top of the shell or the body 5 of the apparatus. The weight 76, by reason of being movably supported or suspended, is adapted to be moved sidewise on or relatively to the frame or body of the apparatus, whenever the same is tipped or tilted laterally. When the weight so swings or moves sidewise, it operates on the rod 74, through the medium of transversely extending arms 78 and 79 on the inner side of said rod 74, as clearly seen in Fig. 10; said transversely extending arms 78 and 79 being shown as formed by making a U-shaped bend in the end portion of said rod, so that the part of the rod adjacent to the weight has a looped portion extending around three sides of the weight.

As clearly seen in Figs. 10 and 11, the weight 76, being free to move or swing laterally when the frame of the machine is tipped or tilted sidewise will, when moved from its central position, come in contact with one of the arms 78 or 79 on the rod 74 and thus move or shift said rod endwise. The valve 72 is so arranged that it stands normally at one end of its stroke and in position to permit the air pressure to act constantly on the piston and hold the same at that end of its stroke in which the shutters 45, 45 are closed, when the apparatus is level and the weight hangs centrally between the arms 78 and 79. If, however, the apparatus is tilted sidewise, the weight will swing toward the lower side of the apparatus and come in contact with the arm 78 to shift the valve in a direction to admit air to the opposite end of the cylinder, with the result of moving the piston in a direction to open the said shutters. As illustrated, the piston stands normally at the outer end of the cylinder, and when air is admitted to such outer end of the same, the piston will be forced toward the inner end of the cylinder, thus swinging the lower end of the lever 68 inwardly and its upper end outwardly, and moving the gates or shutters in a direction to uncover the openings in the wing, which has been lifted by the action of the air current. The upward pressure of air on the elevated wing will then be relieved and the device will resume its normal or horizontal position, but as soon as the horizontal position is reached, the weight 76, swinging in the opposite direction from its former movement, will strike the inner arm 79 and thereby move or shift the rod 74 endwise in a direction to carry the valve to the opposite limit of its movement and thus admit air to the opposite or inner end of the cylinder, and the air so admitted, acting on the piston, carries the same back to its original or normal position, with the effect of shifting the gates or valves outwardly and closing the holes in the wing member; the air pressure remaining on the piston, so as to maintain the shutters closed until they are again operated. It will be understood from the above, that in the case of the controlling device for each wing, the movable weight 76, when the apparatus is inclined from its normal position, will operate the valve of its associated cylinder to admit air to one end of the latter, when swung or moved laterally in one direction, and will operate said valve to admit air to the opposite end of the cylinder when swung or moved in the opposite direction, through the returning of the apparatus to its normal or horizontal position.

Figure 2:
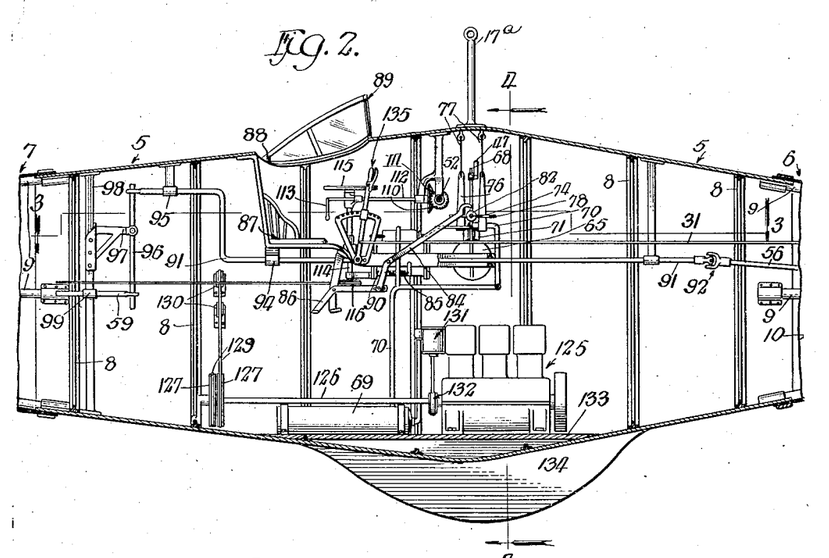
Fig. 2 is a view in central vertical section on a larger scale, of the main or central part of the apparatus.
Figure 3:
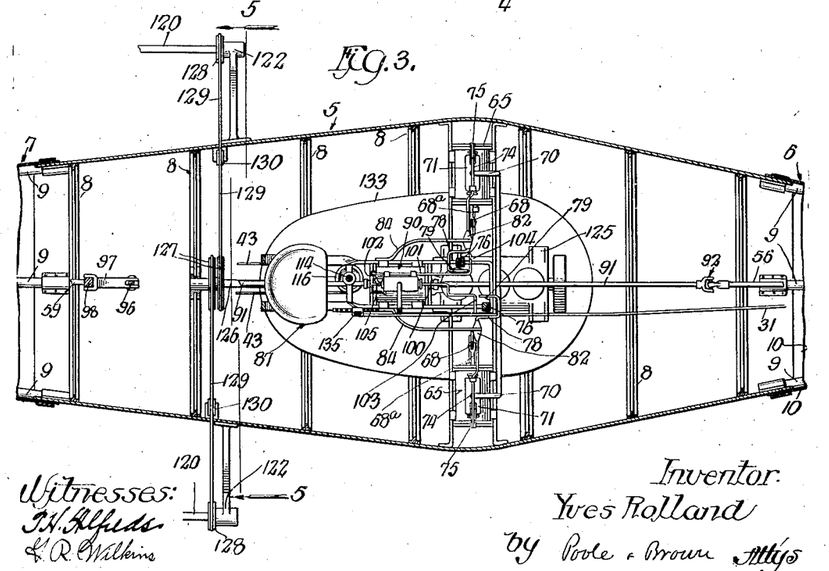
Fig. 3 is a horizontal or plan section through the shell or casing which incloses the principal working parts, showing in plan view the devices illustrated in Fig. 2.

From the foregoing description of the operation of these parts it will be manifest that the devices described afford an automatic or self-acting means for maintaining the balance of the apparatus when in flight, it being understood that when the apparatus is thrown out of level by the action of irregular air currents acting upwardly on one of the wings, or downwardly on the other wing, the wing which is elevated will be immediately deprived of sustaining power by the lessening of its supporting area, to an extent required to permit the apparatus to regain its normal position, and that the openings in such wing will be closed as soon as such normal position is reached. It will, however, sometimes be necessary that the apparatus should take a laterally inclined position without any operation of the automatic controlling devices as, for instance, when the machine is making a sharp turn in the air, in which case it will have to be entirely under the control of the operator. I therefore provide means for throwing the automatic controlling devices out of operation, as follows:

Referring again to the actuating devices for the sliding shutters on one of the wing members, the valve actuating rod 74 is provided (Figs. 2, 3, 11 and 12) with an enlargement 82, which is tapered at its ends, or has the form of a double cone, and is provided at its largest part with an annular groove 83. On the frame of the apparatus is pivotally mounted a lever 84 arranged to swing in a vertical plane at right angles to the rod 74, the upper end of said lever is located at a point adjacent to the operating rod 74, and is adapted to enter or engage the groove 83, when the rod 74 is in its normal position; said lever being provided with a curved end portion to fit in said groove, as shown in Fig. 2. Said lever 84 is held by a spring 85, with its swinging end disengaged from the conical enlargement 82, and a foot-actuated lever 86 is connected with the lower end of said lever 84, and is arranged that downward pressure of the foot of the operator thereon will operate to throw the lever 84 into engagement with the said groove 83. If, therefore, the operator desires to prevent the automatic action of the balancing devices, he presses downwardly on the lever 86, and the lever 84 then engages the said groove 83 so as to lock the operating rod 74 from movement, and the parts may be maintained in this position so long as it may be found necessary.

The drawing shows a seat 87, for the operator, supported in position within and near the top of the tubular body 5 of the apparatus. Said body 5 is provided, above the seat, with an opening 88 for the upper part of the body of the operator. At the front and sides of said opening, an upwardly projecting shield 89 is provided to protect the operator; the same being provided with windows of glass or other transparent material at its front and sides. The foot levers 86, 86, for the two automatic controlling devices are located one at each side of and below the seat 87, so that the feet of the operator can be easily applied to said foot lever.

Devices are provided for operating automatically the movable sections 55, 58, 58, of the horizontal rudder and tail member, corresponding in some respects with the devices hereinbefore described for actuating the shutters of the lateral wing members, and embracing a single motor adapted to give movement to said movable sections 55, 58, 58 in unison, so as to decrease the area of the horizontal rudder at the same time that the area of the tail member is increased, and vice versa. Referring now to the particular construction shown in these last named devices, 90 indicates a horizontally arranged power cylinder (shown in plan view in Fig. 10), which is located within the tubular body 5 with its central axis extending in a direction longitudinally of the machine. Said cylinder 90 is provided with a piston, piston rod and controlling valve. These parts are constructed in the same manner as in the case of the cylinder 65, hereinbefore described, and are not therefore shown in detail in the drawings. The piston rod belonging to the cylinder 90, indicated by 91 in the drawings, passes through both ends of said cylinder 90. At its forward end said piston rod is connected by a universal joint 92 with the endwise movable operating rod 56, by which the movable section 55 of the horizontal rudder 18 is actuated. The rear end of said piston rod 91, as clearly seen in Fig. 2, is extended upwardly at the rear of the operator's seat 87 and then horizontally near the top of the body 5, the same being supported in guides 94, 95. At its rear end said rod 91 is connected with the upper end of a vertically arranged lever 96, which is pivoted between its ends to a bracket 97, attached to an upright frame member 98, located in the rear part of the body 5. The forward end of the operating rod 59, for the movable sections 58, 58 of the tail member, is extended through a guide 99 on the standard 98, and is pivotally connected with the lower end of the lever 96, as clearly shown in Fig. 2. From the construction described in these parts, it will be seen that when the piston rod 91 is moved forwardly and backwardly, the forward and rear movable sections 55, 58, 58 will be correspondingly moved or shifted, but in reverse directions, that is to say, when the area of the forward plane is increased, that of the rear plane will be diminished, and vice versa. Compressed air is supplied to the valve chest of the cylinder 90 by a branch pipe from the supply pipe 70.

Now referring to the construction of the devices for controlling the admission of compressed air to the opposite ends of the cylinder 90, these are constructed as follows: The valve rod 100 of the cylinder 90 extends through the ends of the valve chest of said cylinder, and at its forward end said valve rod extends to a point adjacent to one of the controlling weights 76. An operating rod 101 is arranged parallel with the valve rod and is connected at its rear end with the rear end of said valve rod by a rocking lever 102. The forward end of said rod 101 terminates adjacent to the other one of the movable weights 76. Said weights are so hung as to swing freely in all directions, and are adapted to act upon said rods 100, 101, when the weights are moved backwardly and forwardly by the tipping or tilting of the apparatus, in the same way that they act on the rods 74, 74 when the apparatus is tilted sidewise. To provide for proper operation of said weights on the rods 100 and 101, the valve rod 100 is provided with a laterally extended arm 103 extending at the rear of one of the weights 76, while the rod 101 is provided with a like arm 104 extending horizontally forward of the other weight 76. From this construction it will be understood that one of the said weights will operate on the valve rod 100 to shift the valve forwardly, while the other weight will act on the rod 101 to shift the valve in the same direction.

A spring 105 shown as having the form of a coiled spring, acting by contraction, is applied to act in the valve stem 100 in a direction to hold the valve normally at the rearward limit of its movement, so that in the final operation of the apparatus, compressed air in the forward end of the cylinder will hold the piston and piston rod at the rearward limit of the movement thereof, with the movable section 55, of the horizontal rudder, in its closed position, and the movable sections 58, 58 of the tail member retracted or drawn inwardly.

In the operation of these devices it will be understood that, if the apparatus be thrown in an inclined position with its forward end downwardly, one of the weights 76 acting forwardly on the arm 104 of the rod 101 will shift the valve of the cylinder 90 forwardly so as to admit compressed air to the rear end of the cylinder, with the effect of moving the piston rod 91 forwardly thereby shifting the movable section 55 in a direction to uncover the opening in the forward plane and decrease the area thereof, while at the same time shifting the rear operating rod 59 rearwardly with the effect of throwing outwardly the movable sections 58, 58 and increasing the area of the rear plane. Similarly, if the apparatus is thrown to an abnormal angle with its forward end lifted and its rear end depressed, the other weight 76 will swing rearwardly and, acting on the arm 103 of the valve rod 100 to shift said rod forwardly thereby also admitting air to the rear end of the cylinder 90, with the result of moving the piston rod 91 in the same direction, to decrease the area of the forward plane and increase the area of the rear plane. In both cases, one of the weights 76 acts on the valve in opposition to the tension of the spring 105, which latter when the apparatus resumes its horizontal or normal position, restores the valve to its rearward position, with the result of admitting air to the forward end of the cylinder and restoring to their normal positions the shifting sections of the horizontal rudder and tail member. By the operation of the parts last described, therefore, the apparatus will be automatically maintained in its horizontal position or at any inclination into which it may be thrown by the operator through the tipping or tilting of the horizontal rudder 18, without any attention on the part of the operator; the weights 76, 76 operating on the valve of the cylinder to give motion to the piston rod 21 in a direction to enlarge the area of the tail member and decrease the area of the horizontal rudder, as required to give an increased upward or downward air pressure on the tail member and a decreased upward or downward air pressure on the horizontal rudder as required to restore the apparatus, when its equilibrium has been disturbed by the action of irregular upwardly or downwardly moving air currents thereon.

It is to be understood that the movable sections of the horizontal rudder and tail member operate in a somewhat different manner than those of the lateral planes or wings. In the case of the latter the movable shutters or sections are in a closed position, and are opened in the case of a wing member which is lifted above its normal position to decrease the supporting effect of such wing member, while in the case of the horizontal rudder and tail member, the movable sections thereof stand normally in position to give a maximum area in the horizontal rudder and a minimum area in the tail member, and when the rear end of the apparatus is thrown up or down, the area of the horizontal rudder is decreased, while the area of the tail member is correspondingly decreased, so that the air pressure due to the rapid forward movement of the apparatus, will act on said tail member with enhanced effect to restore the apparatus to its horizontal position or normal position with respect to the line of flight, it being of course understood that the actual inclination of the apparatus is at all times controlled by manipulation of the horizontal rudder, as required for the purpose of steering the apparatus upwardly or downwardly.

As before described, the lateral wing members are provided at their outer ends with the pivoted planes 50, 50 which are controlled by the operator to maintain the equilibrium of the apparatus through the action of the air on said pivoted planes in the forward movement of the apparatus. For this purpose said pivoted planes are so connected with each other that they will be returned or rotated to a corresponding extent in opposite directions when moved by the operator. As before stated, said pivoted planes are operated by rock shafts 52 which extend through the wall of the body 5 to the interior of the same. Said rock shafts, as clearly seen in Figs. 2 and 4, are provided at their inner ends with gear pinions 110, 110, that intermesh with the opposite sides of a gear wheel 111, mounted on a shaft 112, which extends longitudinally of the machine, and has attached to its rear end an operating lever 113 located in front of the operator's seat 87. For operating the vertical steering rudder 20, an upright shaft 114 is mounted on the frame of the apparatus in front of the operator's seat 87, and is provided at its upper end with a steering wheel 115. At its lower end said shaft 114 is provided with a wheel or pulley 116, around which pass the two cords or wires 43, 43, that, as before stated, are attached to the arms 42 on the rudder shaft 40 and extend therefrom forward into the body of the apparatus.

The propelling mechanism illustrated embraces two horizontal, longitudinally arranged shafts 120, 120 located at the opposite sides of the rear portion of the hollow body 5 and the rear extension 7 thereof, and carrying at their rear ends propellers 121, 121. Said shafts 120, 120 are mounted in bearings at the outer ends of outwardly extending brackets 122, 122 attached to the body 5 of the apparatus. The engine or main motor 125 of the apparatus is mounted in the interior of the hollow body 5, at the lower part of the same, with its crank shaft 126 extending lengthwise of the body. For driving the propeller shafts 120, 120 from said motor shaft 126, the latter is provided on its rear end with two fixed belt pulleys 127, 127, while the shafts 120, 120 are provided at their rear ends with belt pulleys 128, 128, severally arranged in the vertical planes with the pulleys 127, 127. Driving belts 129 trained around the pulleys 127 and 128 serve to transmit motion from the crank shaft to the propeller shafts. Said belts pass over guide pulleys or idlers 130, 130, which are mounted in brackets attached to the inner surface of the body 5; the said belts passing through holes in the shell, in the manner illustrated. Air may be compressed within the reservoir 69 by means of an air pump 131 operated by an eccentric 132 on the crank shaft 126 of the motor.

The body or tubular shell 5 of the apparatus not only constitutes an inclosure for the motor and principal operating parts described, but its lower part is made continuous or without openings so that said body serves, like the hull of a boat, to support the apparatus by flotation in case it should descend upon the water. By reason of the fact that the tubular sheet metal body 5 is substantially larger at its middle part than at its ends, and the taper thereof toward its ends is considerable, the said body may be adapted to support the weight of the apparatus in the water, without submergence of the more lightly constructed end portions 6 and 7 of the same.

I have shown the shell as provided in its bottom with a floor 133 on which the motor 125 rests. I have also shown the shell as provided on the central part of its bottom with a depending fin or keel 134, adapted to keep the apparatus in straight course when resting and moving upon the water; the propellers being so located as to extend downward into and operate in the water when the apparatus is floating on the same.

For operating the forward horizontal rudder, to throw the forward end of the apparatus upwardly to effect the rise and descent of the same, the operating rod 31 is extended to and connected at its rear end with an operating lever 135, located forward of the operator's seat 87, said lever being provided with means such as that shown, for locking or holding it in any position to which it may be moved or shifted.

Figure 16:
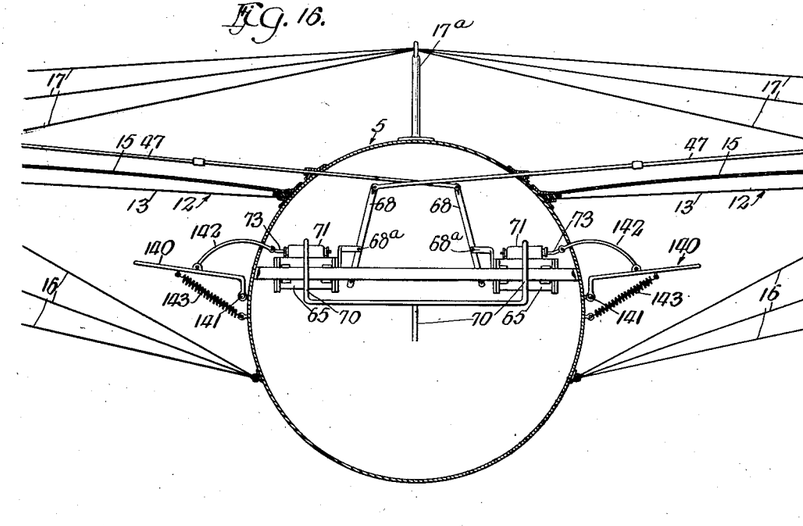
Fig. 16 is a sectional view corresponding generally with Fig. 4, illustrating a modified form of construction embracing laterally extending controlling wings.

In Fig. 16 I have shown a modified form of controlling means for the power cylinder 65, through the medium of which the shutters on each wing are operated. In this instance, the body 5 has on each side of the same an outwardly extending, generally horizontal, auxiliary or controlling wing 140. Said wing is pivotally connected at its inner end by a horizontal, longitudinally arranged pivot 141, with the body 5. Said wing 140 is, moreover, connected with the valve rod 73 of the cylinder 65, by means of a link 142, so arranged with respect to the pivot 141, that when the wing rises and falls, an endwise movement will be given to the valve rod. A contractile, coiled spring 143 is connected with the wing and the body 5 in such manner as to normally hold the wing from rising, and to retain the valve at the outer limit of its stroke, while maintaining air pressure in the inner end of the cylinder. The auxiliary wings arranged as described give generally the same effect as the controlling weight mechanism hereinbefore described, it being obvious that any upward air current that will tend to disturb the equilibrium of the apparatus by acting upwardly on one of the main wing members, will act on the auxiliary wing 140 at the same side of the apparatus, to lift the same and effect the opening of the shutters of that wing member; it being understood that the auxiliary wing members will be very delicately balanced, so that they will be moved to an extent required to operate the valves by a very slight wind pressure.

Figure 17:
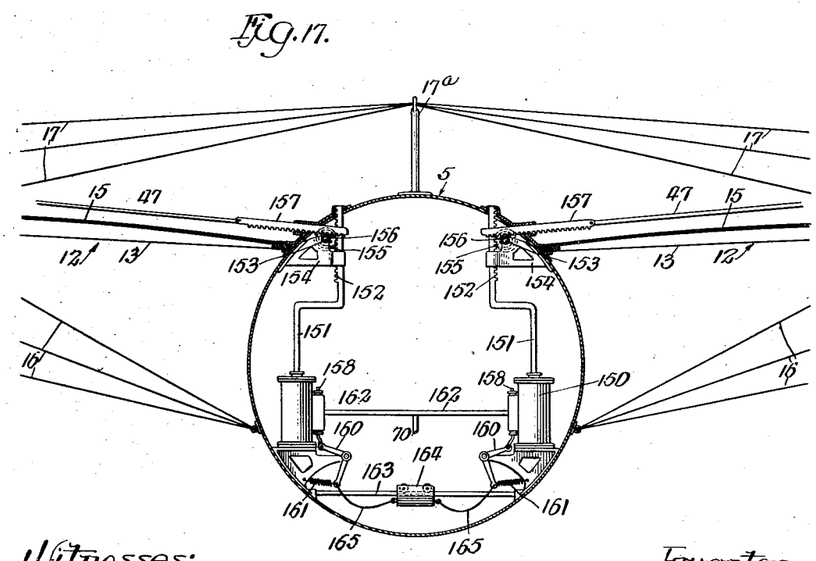
Fig. 17 is a transverse section of the apparatus corresponding generally with Fig. 4, showing a modified construction in the devices for maintaining lateral balance of the apparatus.

In Fig. 17 I have shown a modified form of the devices for operating the shutters of the lateral wing members, embracing power cylinders or motors, controlled or set in operation by a weight. Referring to the device for operating the shutters of one of the wing members, 150 indicates a power cylinder arranged in an upright position and having a piston-rod 151, provided at its upper end with a toothed rack 152. A horizontal shaft 153 is mounted on a bracket 154 secured to the inner face of the body 5, near its top. Said shaft carries two rigidly connected gear-wheels 155 and 156. The rack 152 intermeshes with the gear-wheel 155 and a toothed rack-bar 157 connected with the inner end of the operating rod 47, meshes with the gear-wheel 156. The valve-rod 158 of the cylinder 150 is connected with the horizontal arm of a bell-crank lever 160, having a depending or vertical arm with which is connected a contractile, coiled spring 161. Said spring holds the valve of the cylinder normally at the lower end of its throw, so that pressure from the air supply pipe 162 acts normally in the lower end of the cylinder to keep the piston rod at the upward limit of its stroke, and the shutters 45 closed. 163 is a horizontal transverse guide rod and 164 a sliding weight thereon. Said guide-rod and weight operate in connection with both of the cylinders shown. The weight is connected with the depending arms of both bell-crank levers 160 by means of chains or flexible members 165. These connecting members, when the weight is at its central position on the guide-rod, are slack, or hang loosely. In the operation of this device, when the apparatus is tipped laterally, the weight 164 slides on the rod, and, exerting a pull on one of the bell-crank-levers, operates the same and the valve thereto connected, so as to admit air to the upper end of the cylinder at the then higher side of the apparatus, with the effect of opening the shutters on the wing member which is elevated, thereby permitting that wing member to descend; bringing the apparatus back to its normal position, as hereinbefore described.

It is to be understood that the apparatus described and shown may be variously modified in practice without departure from my invention, and I do not therefore desire to be limited to the specific features illustrated except so far as such features may be herein claimed as parts of my invention.

I claim as my invention:—

1. In an apparatus for aerial flight, the combination with lateral wing members, of sliding sections mounted on said wing members and movable in the planes of the same to increase and decrease the area thereof, said sliding sections when in normal position affording maximum area in said wing members, and actuating means operating automatically through the lateral tipping of the apparatus and acting separately on the sliding sections of each wing member; said actuating means for each sliding section operating to shift said sliding section in a direction to decrease the supporting area of its associated wing member when the apparatus is tilted laterally from its horizontal position in a direction to elevate said wing member, to restore said sliding section to its normal position when the apparatus returns to its horizontal position and to maintain said sliding section in its normal position when the apparatus is tilted from its horizontal position in a direction to depress said wing member.

2. In an apparatus for aerial flight, the combination with lateral wing members provided with openings, of sliding shutters on said wing members normally closing said openings and actuating means operating automatically through the lateral tipping of the apparatus, and acting separately on the sliding shutter of each wing member; said actuating means for each shutter operating to shift said shutter in a direction toward its open position when the apparatus is tilted laterally from its horizontal position in a direction to elevate the wing member carrying the shutter, to restore said shutter to its closed position when the apparatus resumes its horizontal position and to maintain said shutter in its closed position when the apparatus is tilted laterally from its horizontal position in a direction to depress said wing member.

3. In an apparatus for aerial flight, the combination with lateral wing members, of sliding sections mounted on said wing members and movable in the plane of the same to increase and decrease the area thereof, said sliding sections when in normal position affording maximum area in said wing members, a motor for actuating the sliding section on each wing member, and controlling means for each motor embracing a movably mounted weight; each motor and its controlling means operating to shift the sliding section operated thereby from its normal position when the apparatus is laterally tilted from its horizontal position in a direction to elevate the wing member carrying said section, to restore said sliding section to its normal position when the apparatus returns to its horizontal position and to maintain said sliding section in its normal position when the apparatus is tilted laterally from its horizontal position in a direction to depress said wing members.

4. In an apparatus for aerial flight, the combination with lateral wing members each provided with an opening, of sliding shutters mounted on said wing members and movable in the planes of the same, two motors separately actuating said shutters and two movably mounted weights separately controlling the action of said motors, each motor and weight acting to shift the shutter connected therewith from its normal position when the apparatus is laterally tilted from its horizontal position in a direction to elevate the wing member carrying said shutter, to restore said shutter to its normal position when the apparatus is returned to its horizontal position and to maintain the shutter in its normal position when the apparatus is tilted from its horizontal position in a direction to depress said wing member.

5. In an apparatus for aerial flight, the combination with lateral wing members each provided with an opening, of sliding shutters mounted on said wing members and movable in the planes of the same, a motor for actuating each of said shutters, each of said motors embracing a power cylinder, a piston having operative connection with the shutter, a controlling valve, and a movably mounted weight acting to operate the controlling valve of said motor, said weight being arranged to so act on the controlling valve that when the apparatus is in its horizontal position, or tilted laterally from its horizontal position in a direction to depress the wing carrying said shutter, the shutter will be maintained in its normal or closed position, when the apparatus is tilted laterally in a direction from its horizontal position to elevate said wing member, said shutter will be moved from its normal toward its open position, and when said wing member descends, as the apparatus is restored to its horizontal position, said shutter will be moved toward its closed position.

6. In an apparatus for aerial flight, the combination with lateral wing members provided with openings, of sliding shutters on said wing members, normally closing said openings, two motors for actuating said sliding shutters, each motor embracing a power cylinder, a piston and a controlling valve, and two movably mounted weights for actuating said valves, said valves being normally in position to maintain pressure on the pistons in a direction to hold the shutters in closed position, and each weight being adapted, when the apparatus is tilted laterally in one direction, to shift from its normal position the valve of its associated cylinder, to open the shutter of one of the wing members, and when the apparatus is restored to its horizontal position, to restore said valve to its normal position, for closing said shutter.

7. In an apparatus for aerial flight, the combination with lateral wing members, of sliding sections mounted on said wing members and adapted to increase and decrease the area thereof, said sliding sections being normally in position to give maximum area to said wing members, two motors for actuating said sliding sections, each motor embracing a power cylinder, a piston and a controlling valve, and two movably mounted weights for separately actuating said valves, each of said valves being normally in position to maintain pressure on its associated piston in a direction to hold its associated sliding section in normal position, two operating rods connected with said valves and provided each with two arms extending into the path of its associated weight, at opposite sides of the latter, and each weight acting through its associate rod, when the apparatus is tilted laterally from its horizontal position in a direction to elevate its associated wing member, to shift from its normal position its associated motor, thereby effecting movement of the sliding section thereof in a direction to decrease the area of said wing member, and also acting when the apparatus returns to its horizontal position to restore said valve to its normal position thereby effecting movement of said sliding section in a direction to increase the area of said wing member.

8. In an apparatus for aerial flight, the combination with lateral wing members, of sliding sections mounted on said wing members and adapted to increase and decrease the area thereof, said sliding sections being normally in position to give maximum area to said wing members, two motors for actuating said sliding sections, each motor embracing a power cylinder, a piston, and a controlling valve, a valve operating rod, a motion reversing lever connecting said operating rod with the valve, and two movably mounted weights for separately actuating said valves, each valve operating rod being provided with two arms extending at opposite sides of its associated weight and adapted to be acted upon by said weight when the latter is moved away from and back to its normal position, each of said valves being normally in position to maintain pressure on its associated piston in a direction to hold its associated sliding section in its normal position, and each weight acting through its associated rod, when the apparatus is tilted laterally from its horizontal position in a direction to elevate the associated wing member, to shift from its normal position the valve of its associated cylinder, thereby shifting its associated sliding section in a direction to decrease the area of said wing member and also acting through said rod, when the apparatus is restored to its horizontal position, to restore said valve to its normal position, thereby effecting the shifting of said sliding section in a direction to decrease the area of said wing member.

9. In an apparatus for aerial flight, the combination with wing members provided each with a movable section, of actuating means for the movable section of each wing embracing a power cylinder arranged with its central axis horizontal and transversely of the apparatus, a piston and piston-rod, an upright rocking lever connected at its lower end with said piston rod and at its upper end with the movable section, a controlling valve for the power cylinder, a valve actuating rod arranged parallel with the piston, a motion reversing lever connecting said rod with the controlling valve, and a movably mounted weight, said operating rod being provided with lateral arms, extending at opposite sides of the weight, against which said weight acts, when moved laterally, to shift the said controlling valve.

10. In an apparatus for aerial flight, the combination with lateral wing members, of movable sections mounted on said wing members, said sliding sections being normally in position to afford maximum area to said wing members, a motor for actuating the movable section of each wing member, said motor being adapted to maintain the said movable section normally in position for giving maximum area to said wing member and to shift said movable section away from and toward its normal position to lessen and increase the area of said wing member, and means for automatically controlling the operation of said motor, embracing a laterally movable weight and a transversely arranged endwise movable rod provided with lateral arms extending at opposite sides of the weight, said arms being so located relatively to the weight that the weight will normally hold the rod in position to prevent operation of the motor, and will, when moved laterally from and toward its normal position by the tilting of the apparatus from its horizontal position in a direction to elevate the wing member associated with said weight, act on said rod to shift the same for placing the motor in operation, said motor acting, when the rod is moved in one direction, to shift the movable section in a direction to decrease the area of the wing member, and, when the rod is moved in the opposite direction, to shift the said section in a direction to decrease the area of said movable section.

11. In an apparatus for aerial flight, the combination with lateral wing members, each provided with a sliding section adapted when moved to increase or decrease the area of the wing member, a power cylinder provided with a piston and with a piston-rod, which is connected with and actuates said sliding section, a controlling valve for said cylinder, and endwise movable, horizontal, transversely arranged actuating rod connected with said valve, and a movably mounted weight adapted to act on said rod to give endwise movement to the same; the said controlling valve and operating rod being normally in position for maintaining pressure on the piston in a direction to hold the movable section in its closed position and the said weight and operating rod being so arranged that the rod and controlling valve will be shifted by the weight, when the same is moved laterally from its normal position, into position for moving the piston in a direction to open the sliding section, and will be again shifted by said weight when the latter returns to its normal position, into position to give pressure on the piston in a direction to hold the sliding section in its closed position.

12. In an apparatus for aerial flight, the combination with lateral wing members provided with openings, sliding shutters on said wing members for closing said openings, pivotally mounted controlling planes located at the outer ends of said wing members, means operating through lateral tipping of the apparatus for automatically actuating said shutters, and manually operated means for actuating said controlling planes.

13. In an apparatus for aerial flight, the combination with lateral wing members provided each with a plurality of openings, sliding shutters on said wing members applied to open and close at least one of the openings in each wing member, pivotally mounted controlling planes mounted within at least one of the openings in each wing member, means operating automatically through the laterally tipping of the apparatus for automatically actuating said shutters, and manually operated means for actuating said controlling planes.

14. In an apparatus for aerial flight, the combination with lateral wing members provided with openings, sliding shutters on said wing members normally closing said openings, pivotally mounted controlling planes on said wing members, means operating through the lateral tipping of the apparatus acting separately on the shutters of the wing members to automatically open the shutter on that one of the wing members which is elevated in the tipping of the apparatus and manually operable means connected with the controlling planes on the opposite wing members and acting to turn the same simultaneously, and to an equal extent, in opposite directions.

15. In an apparatus for aerial flight, the combination with lateral wing members, of a forward horizontal rudder, and a horizontal tail member, said rudder and tail member being provided with sliding sections adapted to increase and decrease the areas thereof, and means for actuating said sliding sections adapted to increase the area of the tail member when that of the horizontal rudder is decreased.

16. In an apparatus for aerial flight, the combination with lateral wing members, of a forward horizontal rudder provided with an opening therein, a sliding section normally covering said opening, a horizontal tail member, two laterally movable, sliding sections mounted on said tail member and adapted to increase and decrease the width of the same, and means for actuating said sliding section acting on the same in a manner to shift the sliding section on the horizontal rudder in a direction to uncover the opening therein when the sliding sections on the tail member are extended to increase the area thereof.

17. In an apparatus for aerial flight, the combination with lateral wing members, of a forward horizontal rudder, a horizontal tail member, sliding sections mounted on said rudder and tail member, and movable in the planes thereof to increase and decrease the area of the same, a motor applied to actuate said sliding sections, adapted to so move or shift the same that the area of the rudder will be decreased when that of the tail member is increased, and means for automatically controlling said motor operated by the tipping or tilting of the apparatus, and acting to move said sliding sections in a direction to decrease the area of the rudder and increase that of the horizontal rear plane, when the rear end of the apparatus is either elevated or depressed from its normal position.

18. In an apparatus for aerial flight, the combination with lateral wing members, of a horizontal tail member, a sliding section on said tail member, adapted when moved to increase and decrease the area thereof, a cylinder provided with a piston, a piston-rod and a controlling valve, the piston-rod having actuating connection with said sliding section, and means for operating the controlling valve embracing a spring which tends to hold the valve normally in position to maintain pressure on the piston in a direction to keep the sliding section retracted, and two movably mounted weights adapted to act on said valve, against the action of said spring, to shift the same from its normal position when the rear end of the apparatus is either elevated or depressed from its normal position.

19. In an apparatus for aerial flight, the combination with lateral wing members, of a horizontal tail member, a sliding section on said tail member, a power cylinder provided with a piston, a piston rod and a controlling valve, an endwise sliding rod attached to the valve, a second endwise sliding rod, connected with the valve by a pivoted motion reversing lever, a spring applied to hold said valve at one limit of its throw, and two movably mounted weights, said rods being provided with lateral arms, one located in front of one, and the other at the rear of the other, of said weights.

20. In an apparatus for aerial flight, the combination with lateral wing members, of a forward horizontal rudder, and a horizontal tail member, said rudder and tail member being provided with sliding sections adapted to increase and decrease the areas thereof, a power cylinder provided with a piston, a piston rod and a controlling valve, said piston rod having operative connection with the sliding sections on both the horizontal rudder and tail member, and means actuated by the rising or falling of the rear end of the apparatus from its normal position, for operating said controlling valve.

21. In an apparatus for aerial flight, the combination with lateral wing members, of a forward, horizontal rudder, a horizontal tail member, said rudder and tail member being provided with sliding sections adapted to increase and decrease the areas thereof, a power cylinder provided with a piston, a piston rod and a controlling valve, and means operated by the tilting of the apparatus from its normal position for actuating said valve, said piston rod extending through both ends of the cylinder, and being extended forwardly for connection with the sliding section on the horizontal rudder and rearwardly for connection with the sliding section on the tail member.

22. In an apparatus for aerial flight, the combination with the frame of the apparatus, of lateral wing members, a horizontal rudder pivotally mounted to swing on a transverse axis at the forward end of the said frame, said rudder being provided with a rectangular opening, and a sliding shutter on said rudder for closing said opening, said rudder being provided with two parallel, lateral frame members extending forwardly from its pivotal axis and provided with guide grooves on their inner faces to receive the side margins of said shutter.

In testimony, that I claim the foregoing as my invention I affix my signature in the presence of two witnesses, this 24th day of March A. D. 1911.

YVES ROLLAND.

Witnesses:
S. B. MURDOCK,
P. H. ALFREDS.